United States Patent
Nakaya (10) Patent No.: US 9,071,889 B2
(45) Date of Patent: Jun. 30, 2015

(54) SYSTEMS AND METHODS FOR SENSOR SPATIAL DISTRIBUTION MAPPING USING ASSIGNED SENSOR REGIONS

(75) Inventor: Shogo Nakaya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 306 days.

(21) Appl. No.: 13/637,823

(22) PCT Filed: Feb. 8, 2011

(86) PCT No.: PCT/JP2011/052589
§ 371 (c)(1),
(2), (4) Date: Sep. 27, 2012

(87) PCT Pub. No.: WO2011/135886
PCT Pub. Date: Nov. 3, 2011

(65) Prior Publication Data
US 2013/0009753 A1 Jan. 10, 2013

(30) Foreign Application Priority Data
Apr. 27, 2010 (JP) ................................. 2010-101961

(51) Int. Cl.
*G08B 21/00* (2006.01)
*H04Q 9/00* (2006.01)
(Continued)

(52) U.S. Cl.
CPC .............. *H04Q 9/00* (2013.01); *G06K 19/0717* (2013.01); *H04Q 2209/47* (2013.01); *B25J 13/081* (2013.01)

(58) Field of Classification Search
CPC .............. B25J 13/081; G09K 19/0717; H04Q 2209/47; H04Q 9/00
See application file for complete search history.

(56) References Cited

U.S. PATENT DOCUMENTS 6,154,139 A * 11/2000 Heller ........................ 340/573.4
6,204,764 B1 * 3/2001 Maloney .................... 340/568.1
(Continued)

FOREIGN PATENT DOCUMENTS

JP      6-110543 A      4/1994
JP      11-245190 A     9/1999
(Continued)

OTHER PUBLICATIONS

The international search report for PCT/JP2011/052589 mailed on Mar. 15, 2011.
(Continued)

*Primary Examiner* — Mark Rushing
(74) *Attorney, Agent, or Firm* — Sughrue Mion, PLLC (57) ABSTRACT

A radio tag sensor system includes a plurality of radio tag sensor chips, which incorporate respective sensors, store unique identification numbers, a plurality of micro base stations, and a central processing unit which perform communications with the micro base stations via a connection network. Each of the micro base stations performs wireless communications with and wirelessly supplies electric power to only those of the radio tag sensor chips which are disposed in an assigned region thereof. Each of the assigned regions includes at least one radio tag sensor chip which is not included in the other assigned regions. The central processing unit controls the communications via the connection network. The central processing unit collects the sensed values from sensors of the radio tag sensor chips through the micro base stations, generates a spatial distribution map of the sensed values, and updates the spatial distribution map with time.

10 Claims, 9 Drawing Sheets

(51) Int. Cl.
*G06K 19/07* (2006.01)
*B25J 13/08* (2006.01)

(56) References Cited

U.S. PATENT DOCUMENTS

| | | | |
|---|---|---|---|
| 6,259,991 B1* | 7/2001 | Nysen | 701/300 |
| 2002/0196126 A1* | 12/2002 | Eisenberg et al. | 340/10.2 |
| 2004/0244505 A1* | 12/2004 | Takenaka et al. | 73/862.541 |
| 2005/0218679 A1 | 10/2005 | Yokoyama et al. | |
| 2008/0042830 A1* | 2/2008 | Chakraborty et al. | 340/540 |
| 2010/0079257 A1* | 4/2010 | Chang | 340/10.31 |
| 2010/0127829 A1* | 5/2010 | Daneshmand et al. | 340/10.1 |

FOREIGN PATENT DOCUMENTS

| | | |
|---|---|---|
| JP | 2003-188882 A | 7/2003 |
| JP | 2003-298331 A | 10/2003 |
| JP | 2004-283975 A | 10/2004 |
| JP | 2006031633 A | 2/2006 |
| JP | 2006-507501 A | 3/2006 |
| JP | 2006-281347 A | 10/2006 |
| JP | 2006349461 A | 12/2006 |
| JP | 2007079882 A | 3/2007 |
| JP | 2009017405 A | 1/2009 |
| JP | 2009301375 A | 12/2009 |
| WO | 2004000508 A1 | 12/2003 |

OTHER PUBLICATIONS

Japanese Office Action for JP Application No. 2012-512689 mailed on Sep. 30, 2014 with English Translation.

Japanese Office Action for JP Application No. 2012-512689 mailed on Jan. 6, 2015, with English Translation.

\* cited by examiner

SYSTEMS AND METHODS FOR SENSOR SPATIAL DISTRIBUTION MAPPING USING ASSIGNED SENSOR REGIONS

TECHNICAL FIELD

The present invention relates to a radio tag sensor system having a plurality of radio tag sensor chips each with a sensor mounted thereon, and a method of calibrating such a radio tag sensor system, and more particularly to a radio tag sensor system for generating and updating a spatial distribution map representative of a spatial distributions of the sensed values of the sensors, and a method of calibrating such a radio tag sensor system.

BACKGROUND ART

Figure 1:
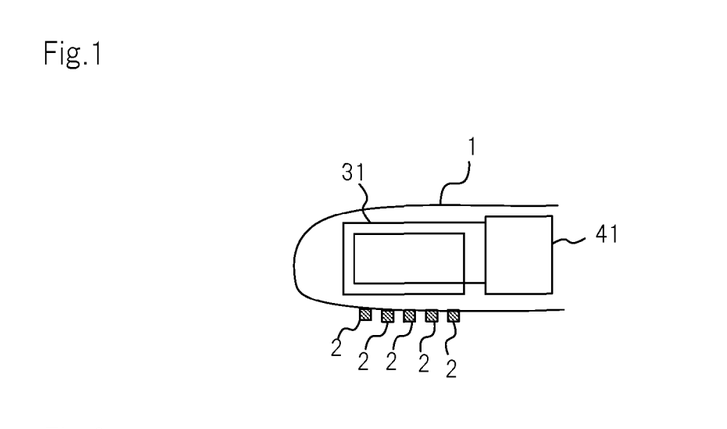
FIG. 1 is a view showing a radio tag sensor system according to relevant art.

An example of radio tag sensor system disclosed in Patent document 1 is shown in FIG. 1. Radio tag sensor chips 2 which operate with wirelessly transmitted power have respective sensors and store unique identification numbers (IDs). Radio tag sensor chips 2 wirelessly send sensed values of the sensors and the identification numbers through antennas. Reader-writer 41 sends data to and receive data from radio tag sensor chips 2 through antenna 31, and wirelessly supplies electric power to radio tag sensor chips 2. A plurality of radio tag sensor chips 2 are mounted on sensitive surface skin 1 of a robot or the like, and single reader-writer 41 and antenna 31 read the sensed values from radio tag sensor chips 2.

Since radio tag sensor chips 2 require no wiring, they are advantageous in that many chips can be placed with a high density and their costs is lowered, because they are free of the problem of reduced reliability which would otherwise be caused by wire disconnections.

The radio tag sensor system disclosed in Patent document 1 can only use radio tag sensor chips within a range wherein they can be wirelessly supplied with electric power from a single reader-writer and an antenna. Therefore, the radio tag sensor system is problematic in that its sensed value collection region where in can collect the sensed values is small.

In order to achieve a wider sensed value collection region, it is proposed that a radio tag sensor system have a plurality of reader-writers and have a reader-writer management terminal to manage the reader-writers, as with a system disclosed in Patent document 2.

Specifically, in the system disclosed in Patent document 2, the reader-writer management terminal and the reader-writers have respective IP addresses, and communicate with each other using the IP addresses. Each of the reader-writers reads and writes the tag information of an RFID tag that is positioned in its own radio communication area, and sends the tag information read from the RFID tag to the reader-writer management terminal according to a command that is stored in an IP packet sent from the reader-writer management terminal by way of unicasting.

The reader-writer and the RFID tag may exchange signals according to a system disclosed in Patent document 3.

Specifically, the system disclosed in Patent document 3 is a book searching system wherein a reader-writer identifies a unique ID of an RFID tag applied to a book to be searched for, and radiates a unique ID indication signal that is indicative of the identified unique ID to a plurality of RFID tags. Each of the RFID tags compares its own stored a unique ID with the unique ID indicated by the unique ID indication signal received from the reader-writer, and, if the compared unique IDs match with each other, returns a unique ID reply signal to the reader-writer.

PRIOR TECHNICAL DOCUMENTS

Patent Documents

Patent document 1: JP2006-349461A
Patent document 2: JP2009-017405A
Patent document 3: JP2009-301375A

SUMMARY OF THE INVENTION

Problems to be Solved by the Invention

The system disclosed in Patent document 2 incorporates a connection network which connects the reader-writers and the reader-writer management terminal. Since the connection network is a LAN using IP packets, it fails to realize a compact, low-cost system.

In recent years, there is a demand for radio tag sensor systems which generate a spatial distribution map representative of spatial distribution of sensed values and updates the spatial distribution map with time.

The system disclosed in Patent document 3 is a book searching system wherein RFID tags return a unique ID reply signal indicative of whether or not there is a book to be searched for or not. The value of the unique ID reply signal is a predetermined value exclusively assigned to an object to be searched for, and does not change from time to time as in the case with sensed values. Therefore, it is not necessary to generate a spatial distribution map of the values of unique ID reply signals and to update the spatial distribution map with time. In other words, the system disclosed in Patent document 3 does not generate and update a spatial distribution map.

It is an object of the present invention to provide a radio tag sensor system which is capable of realizing a wide sensed value collection region using a simple connection network such as a bus or the like and of generating a spatial distribution map of sensed values in the wide sensed value collection region and updating the spatial distribution map with time.

Means for Solving the Problems

A radio tag sensor system according to the present invention comprises:

a plurality of radio tag sensor chips which incorporate respective sensors, store unique identification numbers, perform wireless communications and which are wirelessly supplied with electric power;

a plurality of micro base stations which perform wireless communications with the radio tag sensor chips and wirelessly supply electric power to the radio tag sensor chips; and a central processing unit which performs communications with the micro base stations via a connection network;

wherein each of the micro base stations performs wireless communications with and wirelessly supplies electric power to only those of the radio tag sensor chips which are disposed in an assigned region thereof;

each of the assigned regions includes at least one radio tag sensor chip which is not included in the other assigned regions;

the central processing unit controls the communications via the connection network; and the central processing unit collects the sensed values from sensors of the radio tag sensor chips through the micro base stations, generates a spatial distribution map of the sensed values, and updates the spatial distribution map with time.

A first method of calibrating the radio tag sensor system according to the present invention, wherein each of the sensors comprises a pressure sensor or a strain sensor, comprises:

pressing the radio tag sensor system with a calibration apparatus;

wherein the number of pressed regions of the elastic member which are pressed by the calibration apparatus is smaller than the number of the radio tag sensor chips disposed on or in the elastic member.

A second method of calibrating the radio tag sensor system according to the present invention, wherein each of the sensors comprises a pressure sensor or a strain sensor, comprises:

pressing the radio tag sensor system with a calibration apparatus;

wherein the total area of pressed regions of the elastic member which are pressed by the calibration apparatus is smaller than the surface area of the elastic member.

Advantages of the Invention

According to the present invention, the plural micro base stations and central processing unit are connected by the connection network, and each of the micro base stations has a different assigned region for realizing a wide sensed value collection region. Since one master (the central processing unit) is connected to the plural micro base stations, a wide sensed value collection region can be realized using a simple connection network such as a bus or the like.

The central processing unit as a master controls communications via the connection network for generating a spatial distribution map of sensed values in the wide sensed value collection region and updating the spatial distribution map with time.

MODE FOR CARRYING OUT THE INVENTION

A mode for carrying out the invention will be described below with reference to the drawings.

(1) First Exemplary Embodiment

Figure 2:
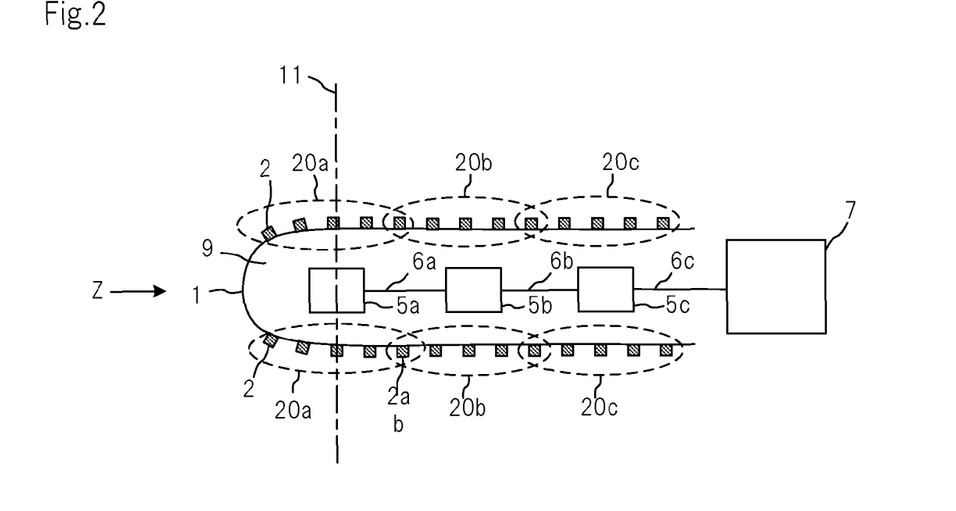
FIG. 2 is a view showing an example of a radio tag sensor system according to a first exemplary embodiment of the present invention.
Figure 3:
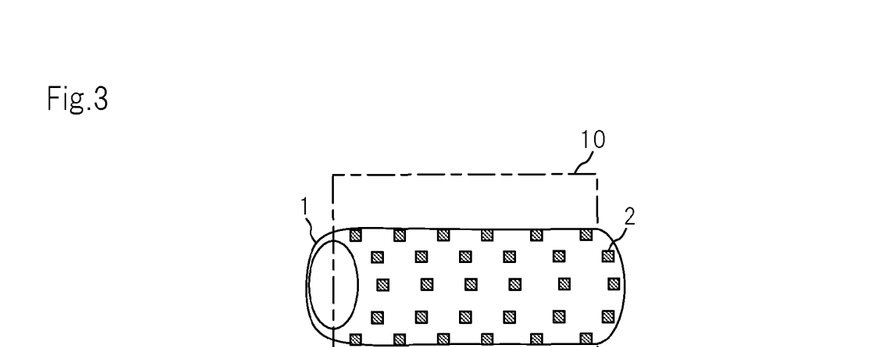
FIG. 3 is a perspective view of a sensitive surface skin shown in FIG. 2.

A first exemplary embodiment of the present invention is concerned with a radio tag sensor system, and an example thereof is shown in FIG. 2. A plurality of radio tag sensor chips 2 are mounted on the surface of sensitive surface skin 1. Sensitive surface skin 1 is shown in perspective in FIG. 3. FIG. 3 shows an example of sensitive surface skin 1 as a slender hollow cylindrical surface skin for a finger, an arm, a leg, or the like of a robot. FIG. 2 is a cross-sectional view of sensitive surface skin 1 taken along sectional plane 10. Sensitive surface skin 1 is filled with elastic material 9 such as rubber, sponge, or the like. According to the present exemplary embodiment, however, the material of sensitive surface skin 1 is not limited to an elastic material. A plurality of micro base stations 5a, 5b, 5c are disposed on the axis of hollow cylindrical sensitive surface skin 1 and are connected to central processing unit 7 in a main system body by connection networks 6a, 6b, 6c. Connection networks 6a, 6b, 6c are used not only to transfer data, but also to supply electric power to micro base stations 5a, 5b, 5c. Micro base stations 5a, 5b, 5c wirelessly supply electric power to and send data to and receive data from radio tag sensor chips 2 that belong to respective assigned regions 20a, 20b, 20c covered thereby. Each of assigned regions 20a, 20b, 20c may include at least one of radio tag sensor chip 2 that does no belong to the other regions. Assigned regions 20a, 20b, 20c may overlap each other. For example, radio tag sensor chip 2ab belong to both assigned regions 20a, 20b. FIG. 3 shows an example wherein there are three micro base stations 5. However, the number of micro base stations 5 may be any number of stations as far as the number is more than one.

Figure 4:
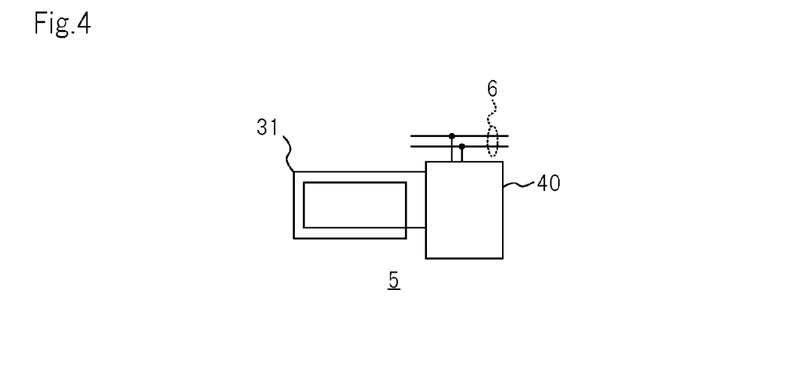
FIG. 4 is a schematic diagram showing an example of a micro base station shown in FIG. 2.

Micro base station 5 has a configuration shown in FIG. 4. Antenna 31 is used both to wirelessly supply electric power to radio tag sensor chips 2 and to send data to and receive data from radio tag sensor chips 2. Circuit unit 40 is connected to antenna 31 and also to connection networks 6 having at least two wires.

Since radio tag sensor chips 2 require no wiring, they are advantageous in that many chips can be placed with a high density and their cost is lowered as they are free of the problem of reduced reliability which would otherwise be caused by wire disconnections. However, since electric power supply and data transmission and reception are performed wirelessly, radio tag sensor chips 2 are problematic in that the region covered by one micro base station 5 is small. According to the present invention, plural micro base stations 5 and central processing unit 7 are connected together by connection networks 6, and micro base stations 5 have respective assigned regions 20 to realize a wide sensed value collection region. Furthermore, as one master (central processing unit 7) is connected to plural micro base stations 5, the wide sensed value collection region is realized by simple connection networks 6. Each of connection networks 6 should preferably be in the form of a serial bus with a reduced number of wires. Connection networks 6 also serve to supply electric power to micro base stations 5. According to the present invention, therefore, simple connection networks 6 such as buses make it possible to realize a radio tag sensor system having a wide sensed value collection region.

Figure 5:
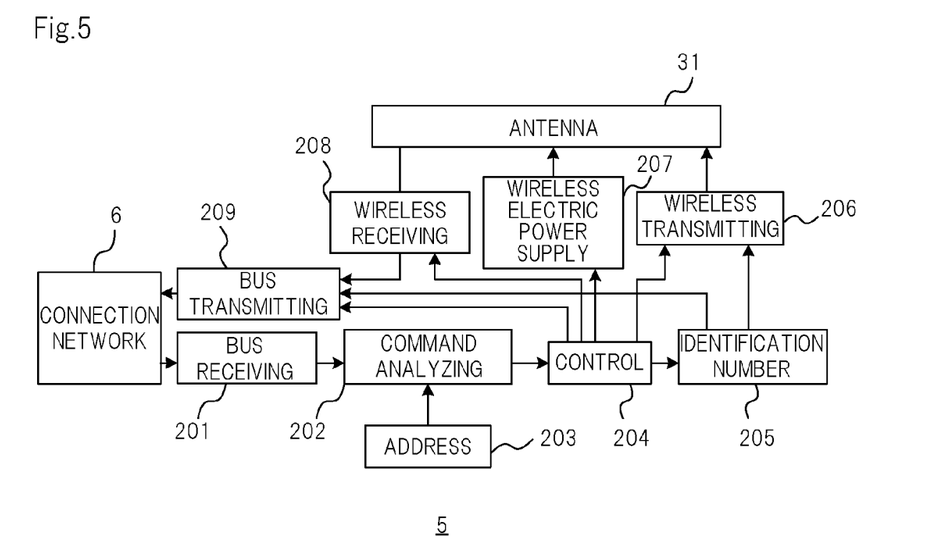
FIG. 5 is a functional block diagram of the micro base station shown in FIG. 2.

FIG. 5 is a functional block diagram of each of micro base stations 5. A command that is sent from central processing unit 7 through connection network 6 is received by bus receiving circuit 201 and then processed by command analyzing circuit 202. If a indicated address included in the command matches address 203 allocated to command analyzing circuit 202, then command analyzing circuit 202 activates control circuit 204 for collecting sensed values. If the indicated address does not match its own address 203, then command analyzing circuit 202 does not carry out any operation, but waits for a next command. When activated, control circuit 204 controls wireless electric power supply circuit 207 to supply electric power to all radio tag sensor chips 2 in its own assigned region 20. Then, control circuit 204 successively generates identification number signals 205 for all radio tag sensor chips 2 in its own assigned region 20, and controls wireless transmitting circuit 206 to successively send generated identification number signals 205 wirelessly. When wireless receiving circuit 208 receives the sensed values from radio tag sensor chips 2, bus transmitting circuit 209 sends the sensed values together with identification numbers 205 to connection network 6 by way of bus transmission. Micro base station 5 operates as described above to generate identification numbers 205. It is possible to send identification numbers together with commands from central processing unit 7. In such a case, micro base station 5 wirelessly transmits the identification numbers sent from central processing unit 7, and does not need to send the identification numbers by way of bus transmission.

As described above, central processing unit 7 controls bus communications through connection networks 6 based on the above command. By successively sending commands indicative of the addresses of micro base stations 5a, 5b, 5c, central processing unit 7 collects the sensed values from the sensors of radio tag sensor chips 2 belonging to assigned regions 20a, 20b, 20c via micro base stations 5a, 5b, 5c, and generates a spatial distribution map of the sensed values. For example, such a spatial distribution map is generated by mapping the sensed values from the sensors of radio tag sensor chips 2 onto positions corresponding to the positions where radio tag sensor chips 2 are installed. Central processing unit 7 can calculate the positions where radio tag sensor chips 2 are installed when the radio tag sensor system is calibrated, as described later.

Central processing unit 7 repeatedly sends commands for respective micro base stations 5a, 5b, 5c at given time intervals to collect updated sensed values that vary from time to time, for thereby updating the spatial distribution map of sensed values with time.

Figure 6:
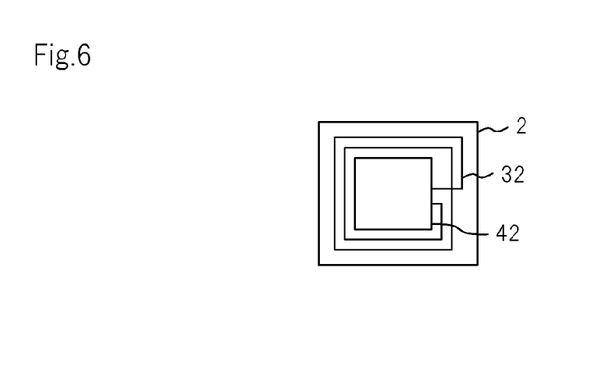
FIG. 6 is a schematic view of a radio tag sensor chip shown in FIG. 2.

FIG. 6 is a plan view showing a general configuration of radio tag sensor chip 2. Antennas 32 for receiving wirelessly supplied electric power and sending and receiving data are laid around the die of radio tag sensor chip 2. Antenna 32 is connected to circuit unit 42.

Figure 7:
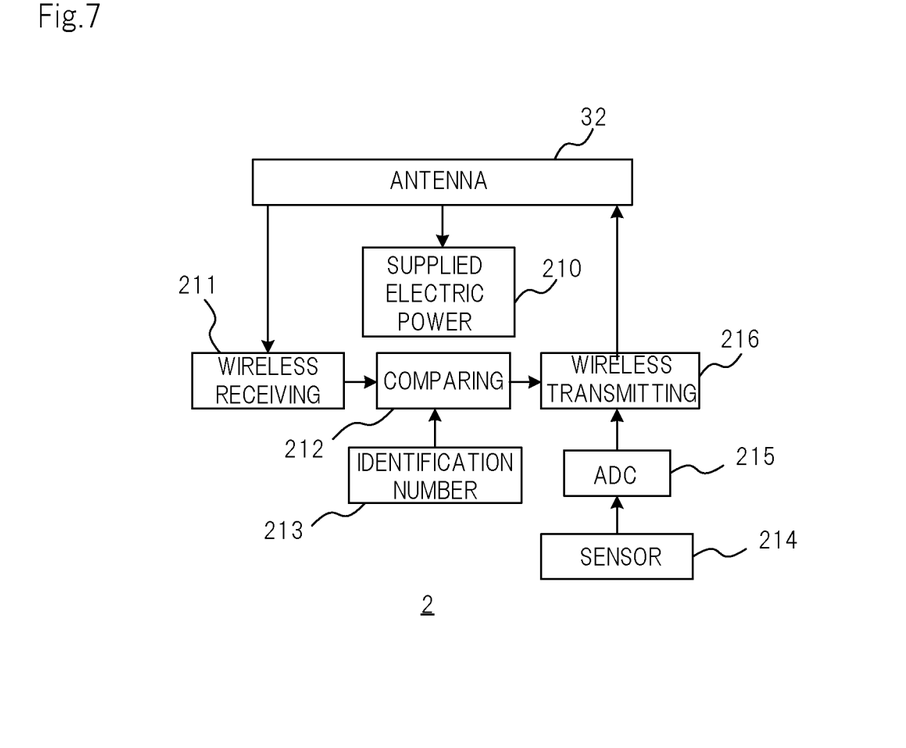
FIG. 7 is a functional block diagram of the radio tag sensor chip shown in FIG. 2.

FIG. 7 is a functional block diagram of radio tag sensor chip 2. Radio tag sensor chip 2 is supplied with electric power 210 from micro base station 5 via antenna 32. An identification number that is wirelessly sent from micro base station 5 is received by antenna 32, and transferred from wireless receiving circuit 211 to comparing circuit 212. Comparing circuit 212 compares the identification number received via antenna 32 with its own identification number 213 that is stored. If these identification numbers do not match with each other, then radio tag sensor chip 2 does not carry out any operation, but keeps waiting for data reception. If the identification numbers match with each other, then radio tag sensor chip 2 wirelessly sends digital data, which have been converted from the sensed value of sensor 214 by A/D converter (ADC) 215, from radio transmitting circuit 216 via antenna 32 to micro base station 5.

Figure 8:
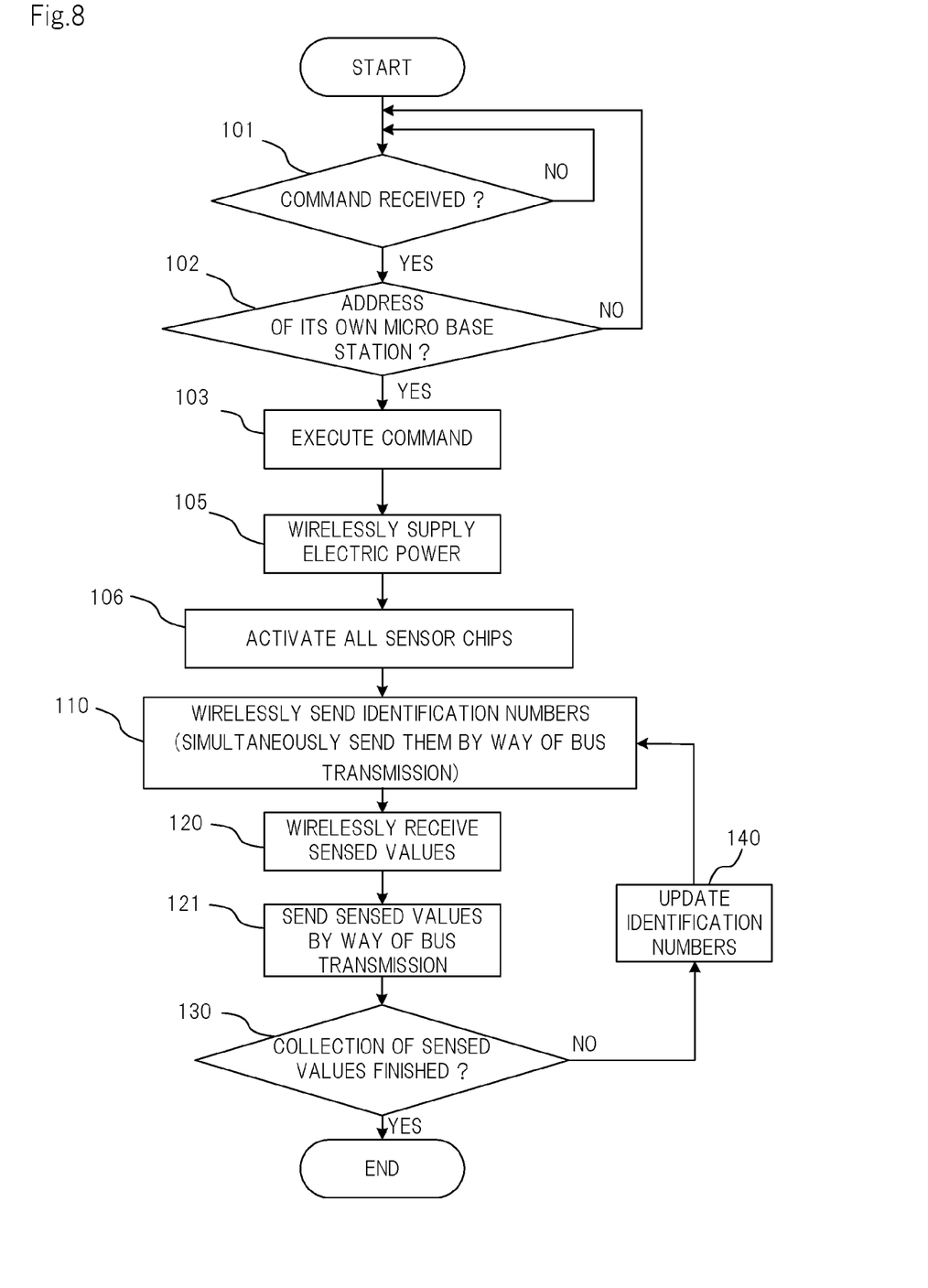
FIG. 8 is a flowchart of an operation sequence of the micro base station shown in FIG. 2.

Operation of micro base station 5 is illustrated in FIG. 8. Micro base station 5 waits for a command sent from central processing unit 7 through connection network 6 (step 101). If micro base station 5 receives a command, then it checks whether or not the indicated address included in the command is the address allocated to its own base station (step 102). If the indicated address is not the address allocated to its own base station, then micro base station 5 does not carry out any operation, but waits for a next command. If the indicated address is the address allocated to its own, then micro base station 5 executes a command (step 103). The command is a sensed value collecting command for instructing the collection of sensed values. Triggered by the reception of the sensed value collecting command, micro base station 5 carries out a subsequent operation sequence. First, micro base station 5 wirelessly supplies electric power via antenna 31 (step 105). All radio tag sensor chips 2 in its assigned region 20 are now activated (step 106). Then, micro base station 5 wirelessly sends identification numbers (IDs) of radio tag sensor chips 2 to all radio tag sensor chips 2 in its assigned region 20, and simultaneously sends the identification numbers to connection network 6 by way of bus transmission (step 110). Only radio sensor chips 2, whose identification numbers match the wirelessly transmitted identification numbers, send their sensed values, which are received by micro base station 5 (step 120). The received sensed values are sent to connection network 6 by way of bus transmission (step 121). Since the identification numbers have already been sent by way of bus transmission in step 110, the set of identification numbers and sensed values is sent via connection network 6 to central processing unit 7 in step 121. Until the collection of the sensed values from all radio tag sensor chips 2 in its assigned region 20 is finished (step 130), micro base station 5 continues to collect sensed values while updating the identification values (step 140).

The above operation sequence is applied to a system wherein central processing unit 7 sends only a sensed value collection command to micro base station 5, and micro base station 5 successively generates identification numbers. The present invention is also applicable to a system wherein central processing unit 7 sends a sensed value collection command with identification numbers included therein, and micro base station 5 collects only the sensed values of radio tag sensor chips 2 which are represented by the identification numbers. In such a case, it is not necessary to send identification numbers to connection network 6 in step 110 and the updating of identification numbers (step 140) based on automatic generation in micro base station 5 is not carried out.

As described above, connection networks 6 use central processing unit 7 as a bus master and all micro base stations 5 as bus slaves.

Figure 9:
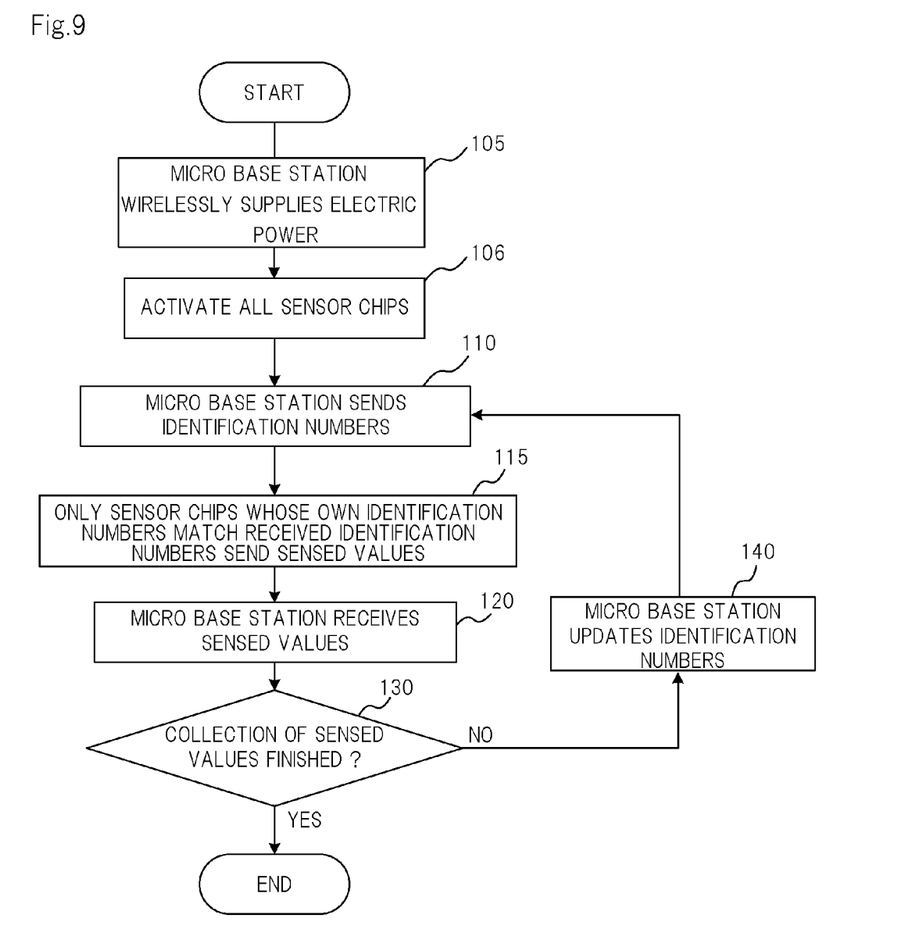
FIG. 9 is a flowchart of an operation sequence of the radio tag sensor chip shown in FIG. 2.

An operation sequence of radio tag sensor chip 2 is illustrated in FIG. 9. When micro base station 5 wirelessly supplies electric power (step 105), all radio tag sensor chips 2 in its assigned region 20 are activated (step 106). Then, micro base station 5 sends identification numbers (IDs) (step 110). Only if the received identification number matches its own identification number, radio tag sensor chip 2 wirelessly sends the sensed value (step 115). Micro base station 5 wirelessly receives the sensed value (step 120). Until the collection of the sensed values from all radio tag sensor chips 2 in its assigned region 20 is finished (step 130), micro base station 5 continues to collect sensed values while updating the identification values (step 140).

Plural radio tag sensor chips 2 belong to assigned region 20 of each of micro base stations 5. If all radio tag sensor chips 2 send their sensed values simultaneously, then it is difficult for micro base station 5 to judge the sensed values correctly. There is a communication system, such as a mobile phone system, wherein a base station can distinguish data simultaneously sent from a plurality of mobile phones in the same frequency band. However, it is difficult to apply such a communication system to the radio tag sensor system according to the present invention because the communication scheme employed by the mobile phone system requires circuits which are complex and consume large amount of electric power, and cannot be used with radio tag sensor chips 2 which operate on wirelessly supplied weak electric power. In accordance with the communication scheme according to the present invention, as described above, only one radio tag sensor chip 2 wirelessly sends its sensed value in one period. Therefore, a circuit which is highly simple and which can be incorporated in radio tag sensor chip 2 allows micro base station 5 to judge the sensed value correctly. As micro base station 5 also has a simple operation sequence, it may incorporate a small-scale circuit, making it possible to reduce the overall cost of the system.

Figure 10:
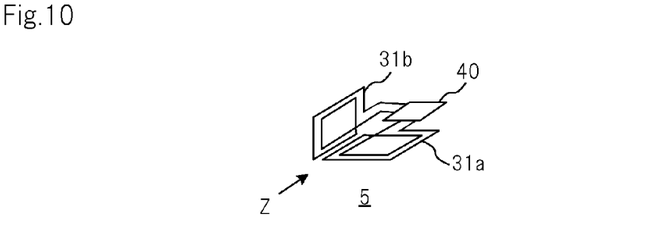
FIG. 10 is a perspective view of another example of the micro base station shown in FIG. 2.
Figure 11:
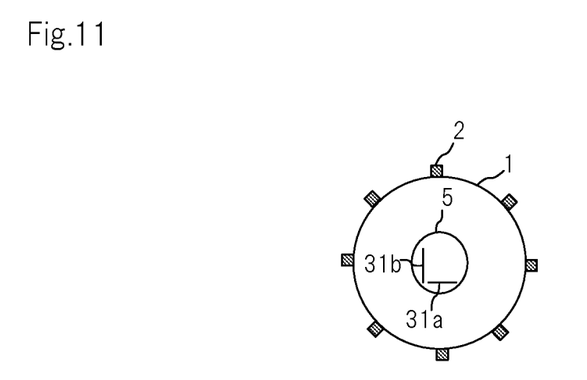
FIG. 11 is a cross-sectional view of the radio tag sensor chip shown in FIG. 2.

If radio tag sensor chips 2 are disposed in all directions around micro base stations 5, as shown in FIG. 3, then depending on their positions, it may be difficult for some radio tag sensor chips 2 to be wirelessly supplied with electric power and to send and receive data via one antenna 31 shown in FIG. 4. Such a problem can effectively be solved by micro base station 5 which has, as shown in FIG. 10, two antennas 31a, 31b connected to circuit unit 40 (connection network 6 is omitted from illustration in FIG. 10). Antennas 31a, 31b have respective loop planes lying perpendicularly to each other for wirelessly supplying electric power and sending data to and receiving data from radio tag sensor chips 2 that are located in any directions. FIG. 11 is a cross-sectional view of a radio tag sensor system incorporating such a micro base station 5. FIG. 11 is taken along sectional plane 11 in FIG. 2, with micro base station 5 viewed in the direction indicated by the arrow Z in FIG. 10. As shown in FIG. 11, antennas 31a, 31b whose respective loop planes lie perpendicularly to each other allow micro base station 5 to communicate sufficiently with any radio tag sensor chips 2 that are disposed on the surface of sensitive surface skin 1 in surrounding relation to micro base station 5.

Figure 12:
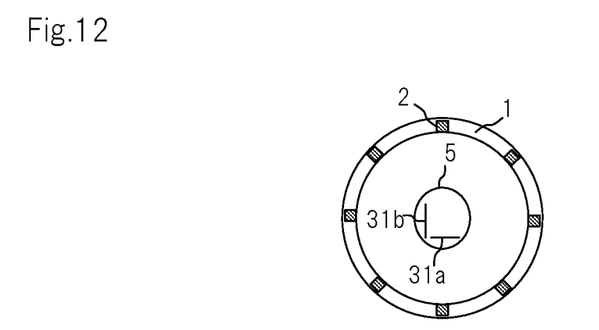
FIG. 12 is a cross-sectional view of another example of the radio tag sensor system according to the first exemplary embodiment of the present invention.
Figure 13:
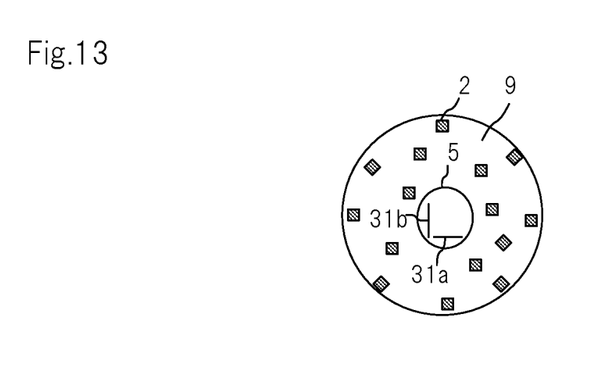
FIG. 13 is a cross-sectional view of still another example of the radio tag sensor system according to the first exemplary embodiment of the present invention.

In the above example, radio tag sensor chips 2 are applied to the surface of sensitive surface skin 1. However, the layout of radio tag sensor chips 2 may be modified insofar as they can communicate sufficiently with micro base station 5. For example, as shown in FIG. 12, radio tag sensor chips 2 may be embedded in sensitive surface skin 1 which is in the form of a thick sheet. Furthermore, as shown in FIG. 13, radio tag sensor chips 2 may be embedded in elastic member 9 made of rubber, sponge, resin, or the like.

Figure 14:
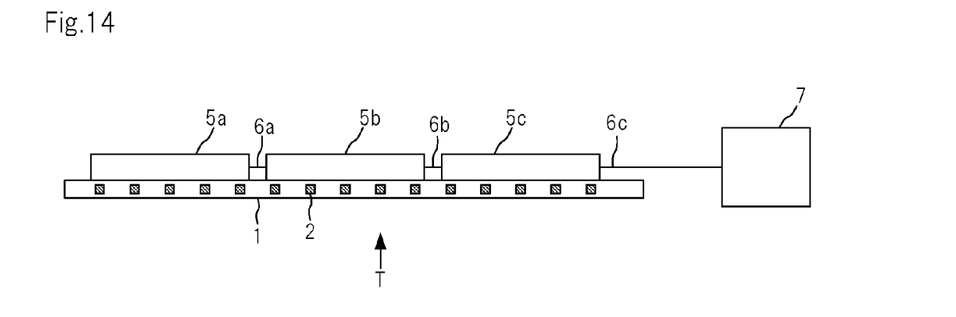
FIG. 14 is a cross-sectional view of yet still another example of the radio tag sensor system according to the first exemplary embodiment of the present invention.
Figure 15:
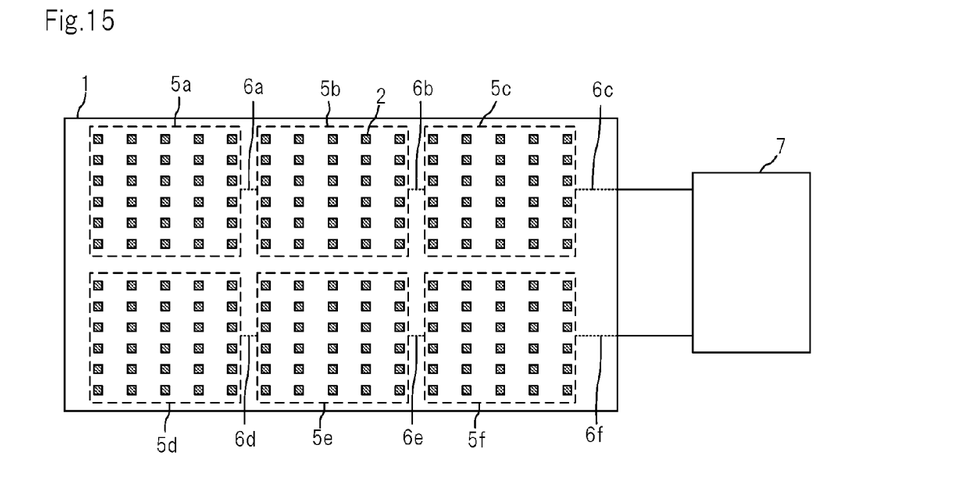
FIG. 15 is a bottom view of the radio tag sensor system shown in FIG. 14.

Another example of the radio tag sensor system according to the first exemplary embodiment is illustrated in cross section in FIG. 14. A plurality of radio tag sensor chips 2 are embedded in sensitive surface skin 1 in the form of thick elastic member 9, and micro base stations 5a, 5b, 5c that are connected to central processing unit 7 by connection networks 6a, 6b, 6c are applied to the surface of sensitive surface skin 1. Each of connection networks 6a, 6b, 6c should most preferably be in the form of a serial bus. FIG. 15 is a bottom view of the radio tag sensor system shown in FIG. 14, as viewed in the direction indicated by the arrow T in FIG. 14. To sensitive surface skin 1, there are applied, in addition to micro base stations 5a, 5b, 5c that are connected to central processing unit 7 by connection networks 6a, 6b, 6c, micro base stations 5d, 5e, 5f that are connected to central processing unit 7 by other connection networks 6d, 6e, 6f. Generally, any number of connection networks may be used to connect micro base stations 5 and central processing unit 7 to each other. The antennas of micro base stations 5 have respective loop planes that lie parallel to the sheet plane of sensitive surface skin 1.

The radio tag sensor system shown in FIGS. 14 and 15 is useful to provide a large-area, high-density sensor system by being installed on the surface of a large housing such as a robot torso or a touch panel. It may also be used in an application wherein it is installed on the wall of a building or the surface of an airplane for detecting cracks or degrees of deterioration.

The sensors incorporated in radio tag sensor chips 2 may be any type of sensor. However, pressure sensors or strain sensors are particularly useful in the radio tag sensor system according to the present invention. Temperature sensors and acceleration sensors are also useful. Furthermore, single radio tag sensor chip 2 may incorporate a plurality of sensors.

According to the present exemplary embodiment, as described above, plural micro base stations 5 and central processing unit 7 are connected by connection networks 6, and each of micro base stations 5 has different assigned region 20 for realizing a wide sensed value collection region. Since one master (central processing unit 7) is connected to plural micro base stations 5, a wide sensed value collection region can be realized using simple connection networks 6 such as buses or the like.

Central processing unit 7 as a master controls communications via connection networks 6 for generating a spatial distribution map of sensed values in the wide sensed value collection region and updating the spatial distribution map with time.

The cost of wiring is reduced by using a serial bus, which may have a reduced number of wires, as each of connection networks 6 that interconnect plural micro base station 5 and central processing unit 7.

Only one radio tag sensor chip 2 wirelessly sends its sensed value in one period. Therefore, a circuit which is highly simple and can be incorporated in radio tag sensor chip 2 allows micro base station 5 to judge the sensed value correctly. As micro base station 5 also has a simple operation sequence, it may incorporate a small-scale circuit, making it possible to reduce the overall cost of the system.

If micro base station 5 has two antennas whose loop planes lie perpendicularly to each other, then micro base station 5 can wirelessly supply electric power and send data to and receive data from radio tag sensor chips 2 that are located in any directions.

(2) Second Exemplary Embodiment

Figure 16:
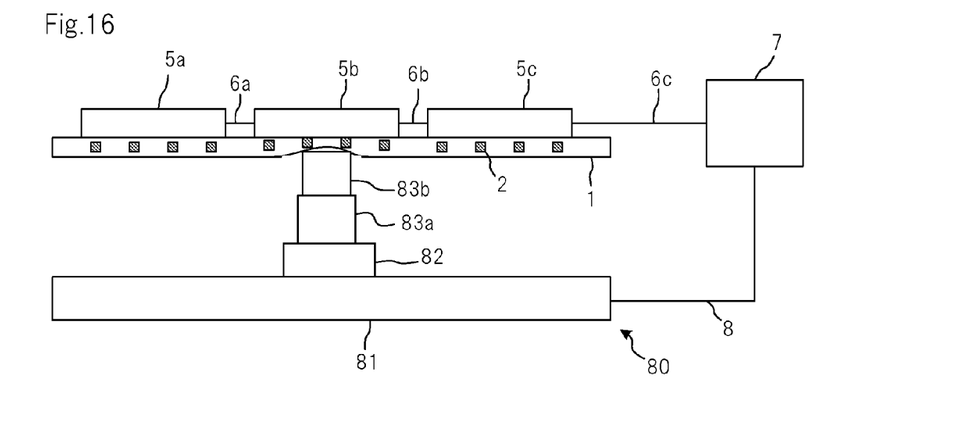
FIG. 16 is a view showing an example of a calibrating device for calibrating a radio tag sensor system according to a second exemplary embodiment of the present invention.

A second exemplary embodiment of the present invention is concerned with a method of and an apparatus for calibrating a radio tag sensor system, and an example thereof is shown in FIG. 16. FIG. 16 shows by way of example a calibration apparatus for use with the radio tag sensor system shown in FIG. 14 which uses pressure sensors or strain sensors. Calibration apparatus 80 applies a stress to sensitive surface skin 1 with radio tag sensor chips 2 embedded therein, and transfers information representing pressed positions and pressures via information transfer link 8 to central processing unit 7. When sensitive surface skin 1 is pressed, central processing unit 7 collects the sensed values of pressure from radio tag sensor chips 2, and associates the collected sensed values with the information transferred from calibration apparatus 80. Central processing unit 7 can now calculate the corresponding relationship between (the identification numbers of) radio tag sensor chips 2 and their positions, and also the sensor characteristics of respective radio tag sensor chips 2 (the corresponding relationship between the pressures at and the sensed values from radio tag sensor chips 2). In FIG. 16, calculating apparatus 80 has Y-axis arm 81, X-axis arm 82, pressing piston 83*a*, and presser 83*b*. Pressing piston 83*a* moves presser 83*b* vertically to apply a pressure indicated by central processing unit 7 to sensitive surface skin 1.

Figure 17:
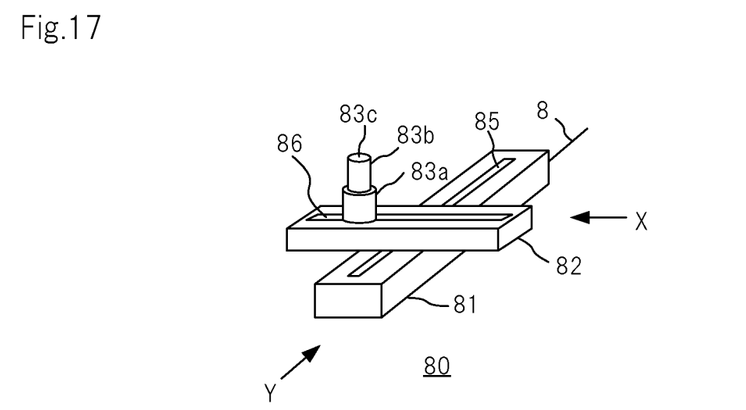
FIG. 17 is a perspective view of the calibrating device shown in FIG. 16.

FIG. 17 is a perspective view of calibration apparatus 80. X-axis arm 82 is movable along a movement groove 85 in Y-axis arm 81. Pressing piston 83*a* is movable along a movement groove 86 in X-axis arm 82. Based on a command sent from central processing unit 7 via information transfer link 8, pressing piston 83*a* moves to any position in a two-dimensional plane. Based on the command, presser 83*b* moves vertically to apply a pressure indicated by the command to a test piece (sensitive surface skin 1 in FIG. 16). In FIG. 16, calibration apparatus 80 is viewed in the direction indicated by the arrow X in FIG. 17.

Figure 18:
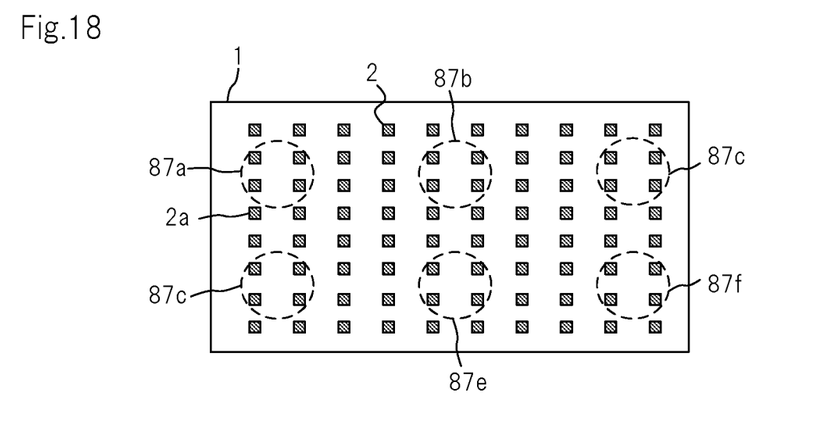
FIG. 18 is a view showing an example of pressurization by calibrating device shown in FIG. 16.

FIG. 18 shows an example of pressurization for calibration. In FIG. 18, sensitive surface skin 1 is viewed from the bottom as with FIG. 15. 87*a*, 87*b*, 87*c*, 87*d*, 87*e*, 87*f* represent pressed regions, i.e., portions of sensitive surface skin 1 which are directly contacted by pressing surface 83*c* in FIG. 17. Pressed regions 87 do not need to cover the entire area of sensitive surface skin 1, and the number of pressed regions 87 may be smaller than the number of radio tag sensor chips 2. This is because since sensitive surface skin 1 comprises elastic member 9, the pressure is transmitted to portions thereof which are not directly contacted by pressing surface 83*c* of calibration apparatus 80. For example, radio tag sensor chip 2*a* shown in FIG. 18 does not belong to any pressed regions, but the pressure developed when nearby pressed regions 87*a*, 87*c* are pressed is transmitted to radio tag sensor chip 2*a* through elastic member 9. Radio tag sensor chip 2*a* can thus be calibrated. Generally, one radio tag sensor chip 2 is affected by the pressure from a plurality of pressed regions. Consequently, it is possible to calibrate all radio tag sensor chips 2 in a small number of pressing cycles by combining and analyzing information about the respective positions and applied pressures of a plurality of pressed regions and information about the sensed values of pressure from radio tag sensor chips 2 at the time the pressures are applied thereto.

Generally, one sensitive surface skin 1 uses a number of radio tag sensor chips 2. Inasmuch as radio tag sensor chips 2 are very small and difficult to handle, it is difficult to apply or embed them in correct orientations at correct positions. It is also difficult to run an operation test on each individual radio tag sensor chip 2 to select chips of uniform performance and then to continuously track down the identification numbers of the chips. Moreover, since even radio tag sensor chips 2 of the same characteristics are subject to different stresses if they are applied or embedded slightly differently, the sensor characteristics suffer inevitable variations.

In order to avoid the above difficulties, the following calibrating procedure is performed: First, no screening test is run on individual radio tag sensor chips 2, but all manufactured chips are used. The manner in which radio tag sensor chips 2 are applied to or embedded in sensitive surface skin 1, and the orientations of the chips are not strictly controlled, but are controlled insofar as cost permits (alternatively, radio tag sensor chips 2 may be applied, embedded, and oriented at random without caution). After a radio tag sensor system has been fabricated using sensitive surface skin 1, the above calibrating process is carried out, which is regarded as a test on radio tag sensor chips 2. Since there are a number of radio tag sensor chips 2, the operation of the entire system is free of problems even if certain defective chips are included in radio tag sensor chips 2. Even if the orientations and sensor characteristics of radio tag sensor chips 2 suffer variations, since the radio tag sensor system is calibrated according to the above calibrating procedure by taking into account the effects of such variations, the operation of the entire system has no problems. The present calibrating procedure is advantageous in that the radio tag sensor system can be tested at a low cost. Furthermore, inasmuch as radio tag sensor chips 2 whose characteristics suffer variations are used at random, the dynamic range of the sensor characteristics of the overall system is wide. Because of the wide dynamic range, the variations of the sensor characteristics of radio tag sensor chips 2 may be intentionally increased.

Figure 19:
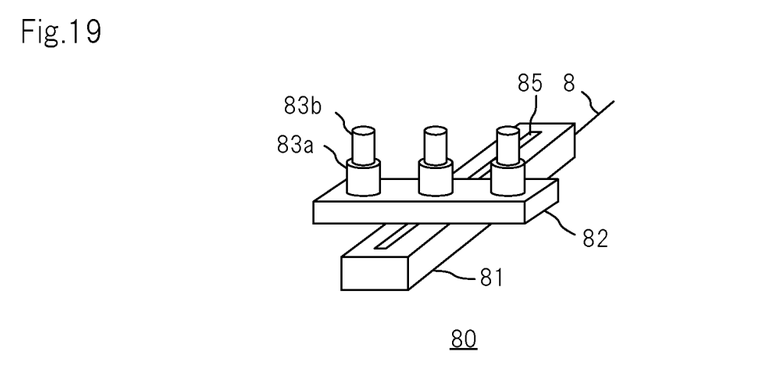
FIG. 19 is a view showing another example of the calibrating device for calibrating the radio tag sensor system according to the second exemplary embodiment of the present invention.
Figure 20:
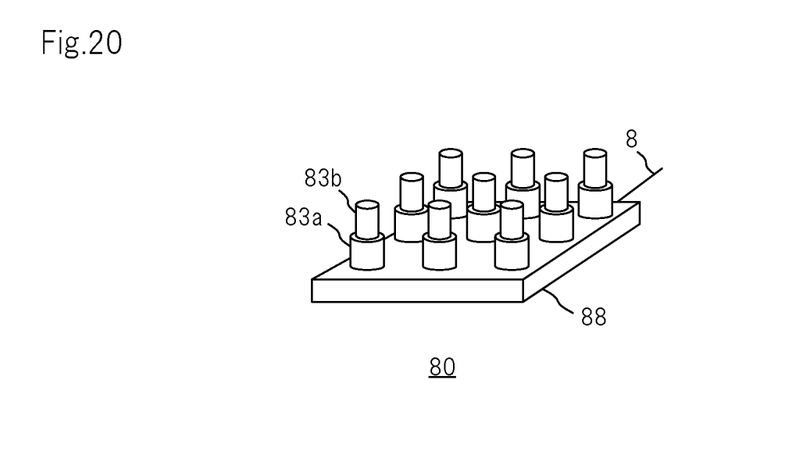
FIG. 20 is a view showing still another example of the calibrating device for calibrating the radio tag sensor system according to the second exemplary embodiment of the present invention.
Figure 21:
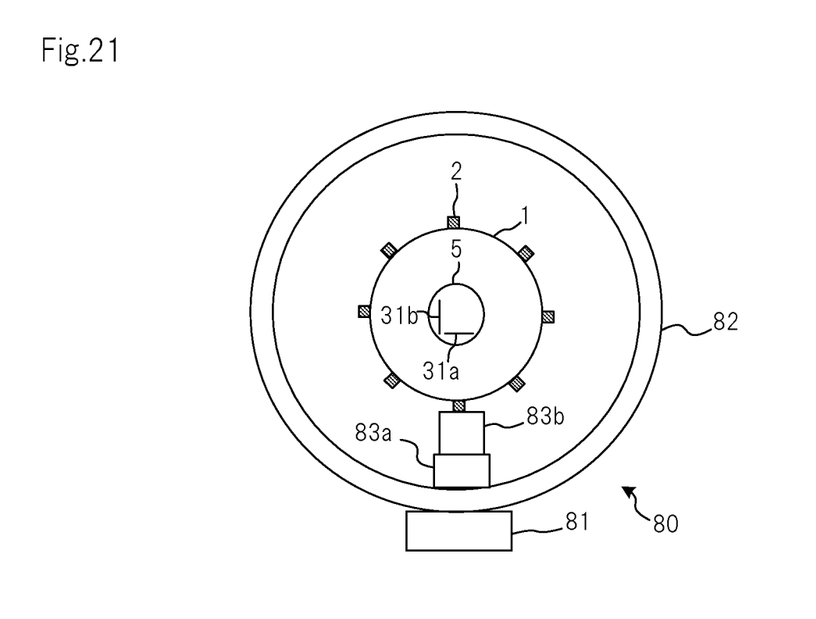
FIG. 21 is a cross-sectional view of the calibrating device shown in FIG. 17.

Calibration apparatus 80 may be of any of various types. For example, as shown in FIG. 19, a plurality of pressing pistons 83*a* may be fixedly mounted on X-axis arm 82. Alternatively, as shown in FIG. 20, a two-dimensional array of pressing pistons 83*a* may be fixedly mounted on a base 88. Further alternatively, calibration apparatus 80 shown in FIG. 21 may be used to calibrate hollow cylindrical sensitive surface skin 1 shown in FIG. 11. In FIG. 21, calibration apparatus 80 has circular X-axis arm 82 surrounding sensitive surface skin 1, with pressing piston 83*a* being movable along the inner circumferential surface of circular X-axis arm 82. Calibration apparatus 80 shown in FIG. 21 is viewed in the direction indicated by the arrow Y in FIG. 17.

Pressing piston 83*a* is not limited to a hollow cylindrical shape, but may be any of other shapes such as a prismatic shape.

In the present exemplary embodiment, as described above, radio tag sensor chips 2 are disposed on the surface of elastic member 9 or in elastic member 9, and the calibrating procedure is carried out using the stress propagating function of elastic member 9. The calibrating procedure is thus simplified, and the number of pressed regions of elastic member 9 may be made smaller than the number of radio tag sensor chips 2 on or in elastic member 9, and the total area of pressed regions of elastic member 9 may be made smaller than the surface area of elastic member 9. The calibrating cost is therefore reduced.

The present invention has been described above with reference to the exemplary embodiments. However, the present invention is not limited to the above exemplary embodiments. Various changes that can be understood by those skilled in the art may be made to the arrangement and details of the present invention within the scope of the present invention.

Part or all of the above exemplary embodiments may be described according to the following supplementary notes, but are not limited thereto:

(Supplementary Note 1)

A radio tag sensor system comprising:

a plurality of radio tag sensor chips which incorporate respective sensors, store unique identification numbers, perform wireless communications and which are wirelessly supplied with electric power;

a plurality of micro base stations which perform wireless communications with said radio tag sensor chips and wirelessly supply electric power to said radio tag sensor chips; and a central processing unit which performs communications with said micro base stations via a connection network;

wherein each of said micro base stations performs wireless communications with and wirelessly supplies electric power to only those of said radio tag sensor chips which are disposed in an assigned region thereof;

each of the assigned regions includes at least one radio tag sensor chip which is not included in the other assigned regions;

said central processing unit controls the communications via the connection network; and said central processing unit collects the sensed values from sensors of said radio tag sensor chips through said micro base stations, generates a spatial distribution map of the sensed values, and updates the spatial distribution map with time.

(Supplementary Note 2)

The radio tag sensor system according to Supplementary note 1, further comprising:

an elastic member, said radio tag sensor chips and said micro base stations being disposed on a surface of said elastic member or in said elastic member.

(Supplementary Note 3)

The radio tag sensor system according to Supplementary note 2, wherein said central processing unit sends a sensed value collection command via said connection network to the micro base stations to which indicated addresses are allocated;

the micro base stations to which the indicated addresses are allocated wirelessly send identification numbers;

the radio tag sensor chips which store identification numbers, that match the wirelessly sent identification numbers, wirelessly send the sensed values from the sensors thereof; and the micro base stations to which the indicated addresses are allocated receive the wirelessly sent sensed values and send the received sensed values via the connection network to said central processing unit.

(Supplementary Note 4)

The radio tag sensor system according to Supplementary note 3, wherein only one of said radio tag sensor chips wirelessly sends the sensed value from the sensor thereof in one period.

(Supplementary Note 5)

The radio tag sensor system according to Supplementary note 4, wherein the micro base stations to which the indicated addresses are allocated send the sensed values to said connection network, and thereafter generate and wirelessly send other identification numbers.

(Supplementary Note 6)

The radio tag sensor system according to Supplementary note 4, wherein the micro base stations to which the indicated addresses are allocated successively generate and wirelessly send all said identification numbers of said radio tag sensor chips disposed in said assigned regions, successively collect the sensed values from the sensors of all said radio tag sensor chips disposed in said assigned regions, and successively send the sensed values via said connection network to said central processing unit.

(Supplementary Note 7)

The radio tag sensor system according to Supplementary note 4, wherein said sensed value collection command sent from central processing unit includes identification numbers; and the micro base stations to which the indicated addresses are allocated collect the sensed values from the sensors of the radio tag sensor chips which store the identification numbers included in said sensed value collection command, and send the sensed values via said connection network to said central processing unit.

(Supplementary Note 8)

The radio tag sensor system according to any one of Supplementary notes 2 through 7, wherein said central processing unit is connected to a plurality of the connection networks.

(Supplementary Note 9)

The radio tag sensor system according to any one of Supplementary notes 2 through 8, wherein each of said micro base stations has two antennas, said two antennas having respective loop planes lying perpendicularly to each other.

(Supplementary Note 10)

The radio tag sensor system according to any one of Supplementary notes 2 through 9, wherein said connection network comprises a serial bus.

(Supplementary Note 11)

The radio tag sensor system according to Supplementary note 10, wherein said connection network supplies electric power to said micro base stations.

(Supplementary Note 12)

The radio tag sensor system according to any one of Supplementary notes 2 through 11, wherein each of said sensors comprises a pressure sensor or a strain sensor.

(Supplementary Note 13)

A method of calibrating a radio tag sensor system according to Supplementary note 12, comprising:

pressing said radio tag sensor system with a calibration apparatus;

wherein the number of pressed regions of said elastic member which are pressed by said calibration apparatus is smaller than the number of the radio tag sensor chips disposed on or in said elastic member.

(Supplementary Note 14)

A method of calibrating a radio tag sensor system according to Supplementary note 12, comprising:

pressing said radio tag sensor system with a calibration apparatus;

wherein the total area of pressed regions of said elastic member which are pressed by said calibration apparatus is smaller than the surface area of said elastic member.

(Supplementary Note 15)

The method according to Supplementary note 13 or 14, wherein two or more of said pressed regions are pressed in calibrating said radio tag sensor chips.

(Supplementary Note 16)

The method according to any one of Supplementary notes 13 through 15, wherein the positions and pressures of pressers of said calibration apparatus are controlled by said central processing unit;

said central processing unit acquires the sensed values from said radio tag sensor chips when said radio tag sensor system is pressed; and said central processing unit calculates the positions and sensor characteristics of said radio tag sensor chips from said sensed values and the positions and pressures of said pressers.

This application is based upon and claims the benefit of priority from Japanese Patent Application No. 2010-101961 filed on Apr. 27, 2010, the entire disclosure of which is incorporated herein by reference.

What is claimed is:

1. A radio tag sensor system comprising:
    a plurality of radio tag sensor chips which incorporate respective sensors, store unique identification numbers, perform wireless communications and which are wirelessly supplied with electric power;
    a plurality of micro base stations which perform wireless communications with the radio tag sensor chips and wirelessly supply electric power to the radio tag sensor chips; and
    a central processing unit which performs communications with the micro base stations via a connection network;
    wherein each of the micro base stations performs wireless communications with and wirelessly supplies electric power to only those of the radio tag sensor chips which are disposed in an assigned region thereof;
    wherein each of the assigned regions includes at least one of the radio tag sensor chips which is not included in the other assigned regions;
    wherein the central processing unit controls the communications via the connection network;
    wherein the central processing unit sends a sensed value collection command via the connection network to the micro base stations to which indicated addresses are allocated;
    wherein only the micro base stations to which the indicated addresses are allocated wirelessly send identification numbers;
    wherein only the radio tag sensor chips that store one of the unique identification numbers matching any of the wirelessly sent identification numbers wirelessly send sensed values from the sensors thereof; and
    wherein the central processing unit collects the sensed values from the sensors of the radio tag sensor chips through the micro base stations, generates a spatial distribution map of the sensed values, and updates the spatial distribution map with time.

2. The radio tag sensor system according to claim 1, further comprising:
    an elastic member, the radio tag sensor chips and the micro base stations being disposed on a surface of the elastic member or in the elastic member.

3. The radio tag sensor system according to claim 2, wherein each of the micro base stations has two antennas, the two antennas having respective loop planes lying perpendicularly to each other.

4. The radio tag sensor system according to claim 2, wherein the connection network comprises a serial bus.

5. The radio tag sensor system according to claim 4, wherein the connection network supplies electric power to the micro base stations.

6. The radio tag sensor system according to claim 2, wherein each of the sensors comprises a pressure sensor or a strain sensor.

7. A method of calibrating a radio tag sensor system according to claim 6, comprising:
    pressing one or more regions of the elastic member by a calibration apparatus;
    wherein a number of the pressed regions is smaller than a number of the radio tag sensor chips disposed on or in the elastic member.

8. A method of calibrating a radio tag sensor system according to claim 6, comprising:
    pressing one or more regions of the elastic member by a calibration apparatus;
    wherein a total area of the pressed regions is smaller than a surface area of the elastic member.

9. The radio tag sensor system according to claim 1, wherein
    the micro base stations to which the indicated addresses are allocated receive the wirelessly sent sensed values and send the received sensed values via the connection network to the central processing unit.

10. The radio tag sensor system according to claim 9, wherein only one of the radio tag sensor chips wirelessly sends the sensed value from the sensor thereof in a single period.

* * * * *